United States Patent
Chiang et al.

(10) Patent No.: US 9,417,699 B2
(45) Date of Patent: Aug. 16, 2016

(54) METHOD AND APPARATUS FOR CONTROLLING A MOBILE DEVICE USING A CAMERA

(75) Inventors: Ching-Liang Chiang, Taoyuan (TW); Chih-Feng Hsu, Taoyuan (TW); Wen-Chi Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1148 days.

(21) Appl. No.: 12/343,055

(22) Filed: Dec. 23, 2008

(65) Prior Publication Data

US 2010/0159981 A1   Jun. 24, 2010

(51) Int. Cl.
*G06F 3/01* (2006.01)
*H04M 1/725* (2006.01)

(52) U.S. Cl.
CPC .............. *G06F 3/017* (2013.01); *H04M 1/725* (2013.01); *H04M 2250/52* (2013.01)

(58) Field of Classification Search
CPC ... G06F 19/321; G06F 19/3406; G06F 3/017; G06T 3/0068; H04M 1/725; H04M 2250/52
USPC .................. 345/156–184, 173–178; 715/863; 382/104, 106, 107, 210, 236
See application file for complete search history.

(56) References Cited

U.S. PATENT DOCUMENTS

| | | | |
|---|---|---|---|
| 5,633,484 A | 5/1997 | Zancho et al. | |
| 7,095,401 B2 | 8/2006 | Liu et al. | |
| 7,385,624 B2 | 6/2008 | Takehara et al. | |
| 2002/0118880 A1* | 8/2002 | Liu et al. | 382/199 |
| 2004/0127197 A1 | 7/2004 | Roskind | |
| 2005/0203430 A1 | 9/2005 | Williams et al. | |

(Continued)

FOREIGN PATENT DOCUMENTS

CN    101267613 A    9/2008

OTHER PUBLICATIONS

Non-Final Office Action for U.S. Appl. No. 12/343,115; Applicant: HTC Corporation; Date of Mailing: Sep. 14, 2011; 18 pages.

(Continued)

*Primary Examiner* — Aneeta Yodichkas
*Assistant Examiner* — Saifeldin Elnafia
(74) *Attorney, Agent, or Firm* — Perkins Coie LLP

(57) ABSTRACT

A method and system for using an image sensor to control applications on a mobile device is disclosed. The system uses image processing to detect control gestures by the user. Control gestures may include, for example, moving a hand laterally, moving the hand closer or farther away from the camera, or opening and closing a hand. These control motions are linked to user commands to be executed by the application being controlled. The system initializes by storing a background image showing the field of view of the image sensor before any objects are present. It then detects new objects in the field of view by comparing new images to the background image. If a new object is detected, the system waits until the object is stationary in the field of view. After the object is stationary, the system detects if there is a change in the object indicating a control gesture. After detecting a change in the stationary object, the system determines a set of parameters defining the change and matches the parameters to a user command. The parameters may include the object's change in position or size or change in hand state (e.g. open or closed). The system then passes the command to an application to be executed.

13 Claims, 11 Drawing Sheets

(56) References Cited

U.S. PATENT DOCUMENTS

| | | |
|---|---|---|
| 2007/0156364 A1 | 7/2007 | Rothkopf |
| 2007/0280540 A1* | 12/2007 | Ikeda .......................... 382/195 |
| 2007/0283296 A1* | 12/2007 | Nilsson ........................ 715/863 |
| 2008/0089587 A1 | 4/2008 | Kim et al. |
| 2008/0111698 A1 | 5/2008 | Atherton |
| 2008/0253614 A1 | 10/2008 | Baer et al. |
| 2009/0300554 A1* | 12/2009 | Kallinen ....................... 715/863 |
| 2010/0022216 A1 | 1/2010 | Bandera et al. |
| 2010/0159908 A1 | 6/2010 | Chang et al. |

OTHER PUBLICATIONS

Final Office Action for U.S. Appl. No. 12/343,115; Applicant: HTC Corporation; Date of Mailing: Feb. 27, 2012; 15 pages.

* cited by examiner

METHOD AND APPARATUS FOR CONTROLLING A MOBILE DEVICE USING A CAMERA

BACKGROUND

As mobile technology improves, mobile devices have become smaller and more powerful. The wireless networks they connect to have improved, as well. These improvements mean that mobile devices can now connect to networks for many functions beyond simple voice calling. For example, they can be used to send e-mail, browse the Internet, and send instant messages. Many devices also include a Global Positioning System (GPS) receiver with integrated mapping (or maps downloaded from a network). In some cases, the mobile devices support wireless standards providing local connectivity, such as the 802.11 family of protocols or Bluetooth. These standards can enable the devices to connect to a WLAN or even communicate with other mobile devices in a peer-to-peer mode. Many mobile devices also include an integrated camera that allows a user to take pictures or record video. Unfortunately, usability has not kept pace with these increased capabilities. The paradigms that work on a desktop do not work on a mobile device because of the size difference. Therefore, there is a need for better user interfaces to make use of these new capabilities. As technology improves, it would be useful to have a user interface for a mobile device that can better make use of the increased capabilities.

DETAILED DESCRIPTION

A method and system for using an image sensor to control applications on a mobile device is disclosed (hereinafter referred to as the "motion recognition user interface system" or the "system"). The system uses image processing to detect control gestures by the user. Control gestures may include, for example, moving a hand laterally, moving the hand closer or farther away from the camera, or opening and closing a hand. These control motions are linked to user commands to be executed by the application being controlled. The system initializes by storing a background image showing the field of view of the image sensor before any objects are present. It then detects new objects in the field of view by comparing new images to the background image. If a new object is detected, the system waits until the object is stationary in the field of view. After the object is stationary, the system detects if there is a change in the object indicating a control gesture. After detecting a change in the stationary object, the system determines a set of parameters defining the change and matches the parameters to a user command. The parameters may include the object's change in position or size or change in hand state (e.g. open or closed). The system then passes the command to an application to be executed.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

I. Representative Environment

Figure 1:
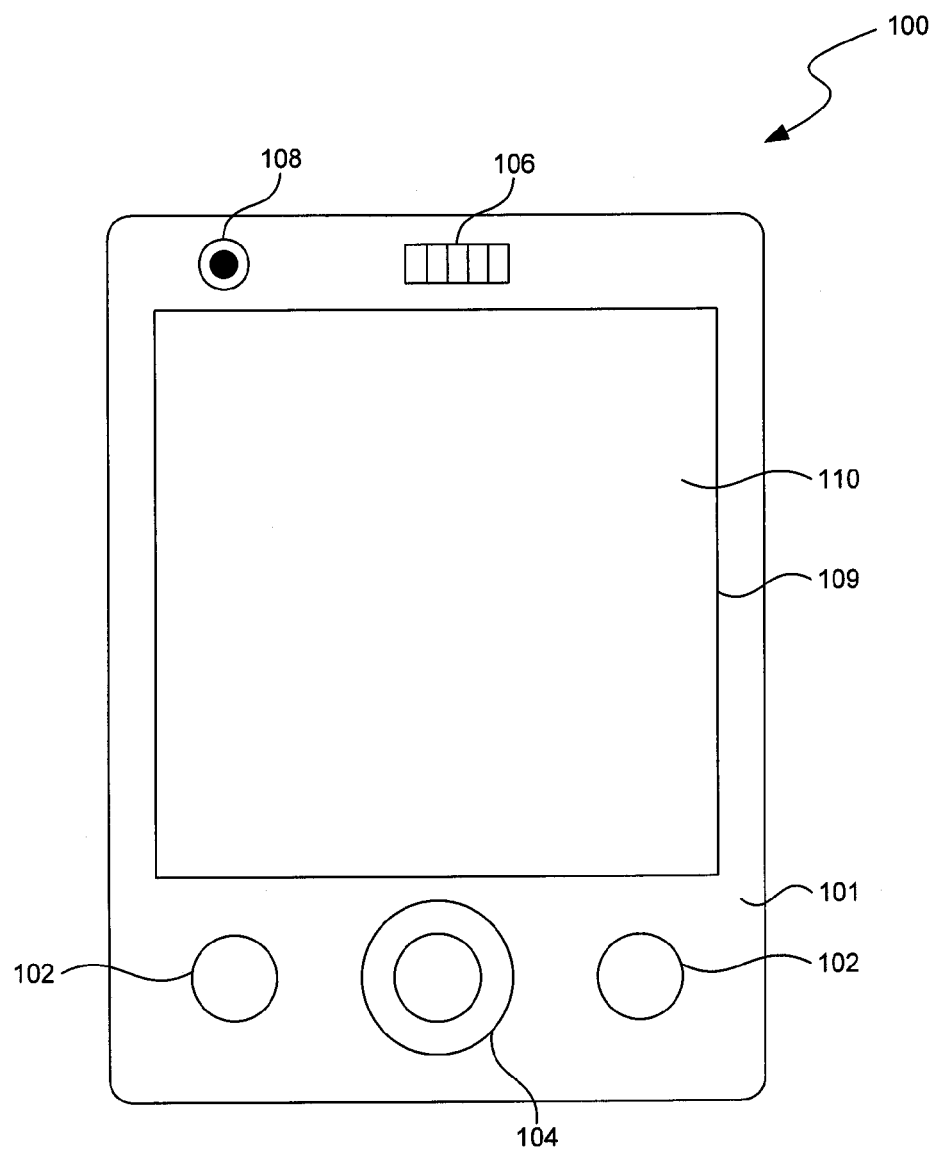
FIG. 1 illustrates a front view of a mobile device suitable for implementing a motion recognition user interface system.

FIG. 1 is a front view of a mobile device suitable for implementing a motion recognition user interface system. As shown in FIG. 1, the mobile device 100 can include a housing 101, a plurality of push buttons 102, a directional keypad 104 (e.g., a five-way key), a speaker 106, a camera 108, and a display 110 carried by the housing 101. The mobile device 100 can also include microphones, transceivers, photo sensors, and/or other computing components generally found in PDA devices, cellular phones, laptop computers, tablet PCs, smart phones, hand-held email devices, or other mobile communication/computing devices.

The display 110 can include a liquid-crystal display (LCD), a plasma display, a vacuum fluorescent display, a light-emitting diode (LED) display, a field emission display, and/or other suitable types of display configured to present a user interface. The mobile device 100 can also include a touch sensing component 109 configured to receive input from a user. For example, the touch sensing component 109 can include a resistive, capacitive, infrared, surface acoustic wave (SAW), and/or other types of touch screen. The touch sensing component 109 can be integrated with the display 110 or can be independent from the display 110. In the illustrated embodiment, the touch sensing component 109 and the display 110 have generally similarly sized access areas. In other embodiments, the touch sensing component 109 and the display 110 can have differently sized access areas. For example, the touch sensing component 109 can have an access area that extends beyond a boundary of the display 110.

The mobile device 100 can also include a camera 108 suitable for taking pictures or recording video. The camera 108 includes an optical image sensor and a lens, and may also have a flash associated with it for taking pictures in low-light conditions. Although the camera component 108 is shown on the front face of the mobile device 100, the camera component 108 could also be located on the rear face of the device. Alternatively, the mobile device 100 might be configured with multiple cameras, such as with a first camera on the front face and a second camera on the back face.

In certain embodiments, in addition to or in lieu of the camera component 108 and the touch sensing component 109, the mobile device 100 can also include a pressure sensor, a temperature sensor, and/or other types of sensors (not shown) independent from or integrated with the display 110. For example, the mobile device 100 can include a thermocouple, a resistive temperature detector, and/or other types of temperature sensors proximate to the display 110 for measuring a temperature of an input mechanism, the display 110, and/or the touch sensing component 109. The mobile device 100 may also include one or more connectors (not shown) that enable the mobile device 100 to connect to other components. For example, the mobile device may include an audio output connector that can connect to headphones or speakers to allow the user to play audio stored on the device or streamed from a network connection. Similarly, the mobile device 100 may include a video connector to enable to the device to connect to a television or other display device. The mobile device 100 may have specialized audio and video connectors or may include a Universal Serial Bus (USB) or other data connector to provide a general data connector.

Figure 2:
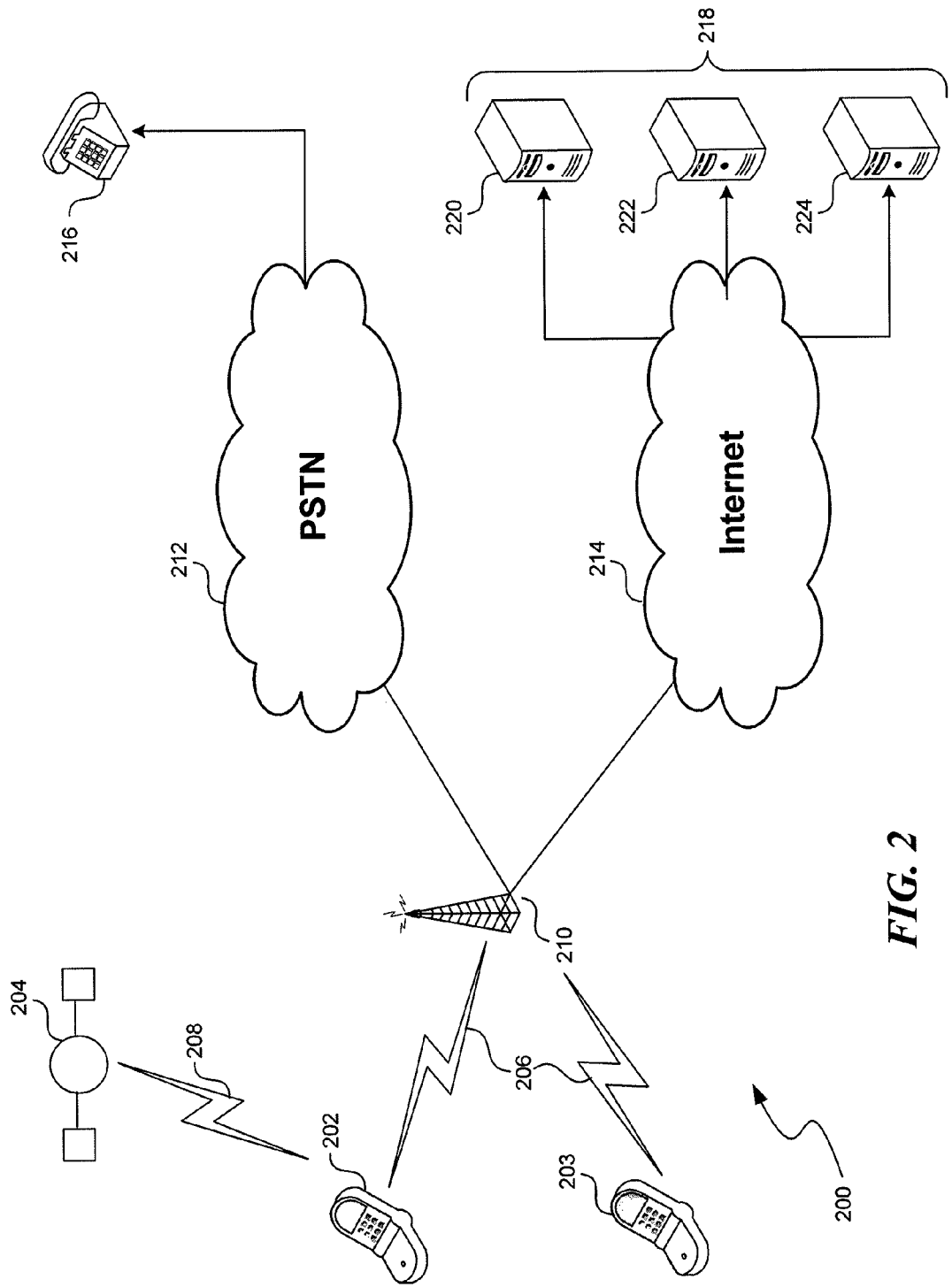
FIG. 2 illustrates a block diagram of a representative environment in which a motion recognition user interface system operates.

FIG. 2 is a block diagram of a representative environment 200 in which a motion recognition user interface system operates. A plurality of mobile devices 202 and 203 roam in an area covered by a wireless network. The mobile devices are, for example, cellular phones or mobile Internet devices. The mobile devices 202 and 203 communicate to a base station 210 through a wireless connection 206. The wireless connection 206 could be implemented using any system for transmitting digital data. For example, the connection could use a cellular network implementing UMTS or CDMA2000 or a non-cellular network implementing WiFi (IEEE 802.11) or Bluetooth. Although wireless connections are most common for these mobile devices, the devices could also communicate using a wired connection such as Ethernet. In some embodiments, the mobile devices 202 and 203 are configured to connect using multiple protocols depending on the situation. For example, the devices could be configured to use WiFi when possible and switch to a slower cellular network such as EDGE otherwise.

In some embodiments, the mobile device 202 also has a Global Positioning System (GPS) receiver embedded in it to provide location information. In these embodiments, the mobile device 202 also receives a location signal 208 from one or more GPS satellites 204. For clarity, the figure only shows one satellite. However, a GPS-enabled device generally receives location signals 208 from several satellites, because a GPS receiver requires several satellites in order to determine its location. Also, although the mobile device 202 in FIG. 2 uses a satellite connection to determine location, it could also infer location based on its position relative to one or more base stations in a cellular network.

The base station 210 is connected to one or more networks that provide backhaul service for the wireless network. The base station 210 is connected to the Public-Switched Telephone Network (PSTN) 212, which provides a connection between the mobile network and a remote telephone 216 on another network. When the user of the mobile device 202 makes a voice telephone call, the base station 210 routes the call through the wireless network's voice backhaul (not shown) to the PSTN 212. The PSTN 212 then automatically connects the call to the remote telephone 216. If the remote telephone 216 is another mobile device, the call is routed through a second wireless network backhaul to another base station.

The base station 210 is also connected to the Internet 214, which provides a packet-based connection to remote devices 218 supporting network applications. When the user of the mobile device 202 makes a data connection, the base station routes the packet data through the wireless network's data backhaul (not shown) to the Internet 214 (or another packet-based network). The internet connects the wireless network to remote devices 218, including an e-mail server 220, a web server 222, and an instant messenger server 224. Of course, the remote devices could include any application available over the Internet, such as a file transfer protocol (FTP) server or a streaming media server. The remote devices could also include other personal computers or mobile devices, where the mobile device 202 is connected through a peer-to-peer connection. This might be used to provide voice services over a data network, such as through Voice over Internet Protocol (VoIP).

Figure 3:
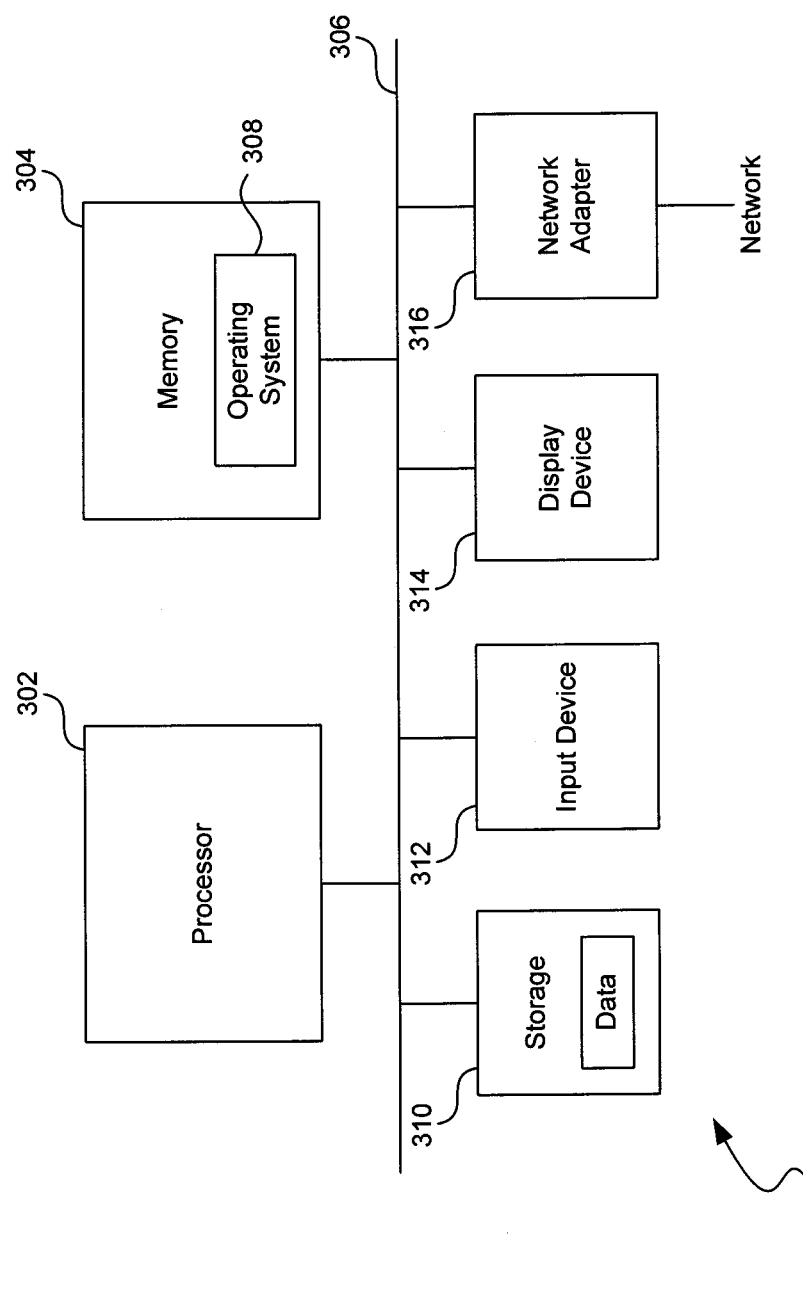
FIG. 3 illustrates a block diagram of an example architecture of a mobile device.

FIG. 3 is a high-level block diagram showing an example of the architecture of a mobile device 300. The mobile device 300 may represent the mobile device 202 of FIG. 2.

The mobile device 300 includes one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 302 may include central processing units (CPUs) of the mobile device 300 and, thus, control the overall operation of the mobile device 300. In certain embodiments, the processor(s) 302 accomplish this by executing software or firmware stored in memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is or includes the main memory of the mobile device 300. The memory 304 represents any form of fixed or removable random access memory (RAM), read-only memory (ROM), flash memory, or the like, or a combination of such devices. In use, the memory 304 stores, among other things, the operating system 308 of the mobile device 300.

The mobile device 300 includes an input device 312, which enables a user to control the device. The input device 312 may include a keyboard, trackpad, touch-sensitive screen, or other standard computer input device. The mobile device 300 also includes a display device 314 suitable for displaying a user interface. The network adapter 314 provides the mobile device 300 with the ability to communicate with remote devices over a network and may be, for example, a wireless adapter. The mobile device 300 may further include local storage 310 coupled to the interconnect 306. The local storage 310 may include, for example, a flash memory device configured to provide mass storage.

II. Motion Detection System

Many of these applications have analogous versions usable on desktop computers. However, the smaller form-factor of a mobile device makes the applications more complicated to control. Hence, there is a need to provide new interface capabilities that are tailored to the capabilities of the mobile devices. The motion recognition user interface system does this by using the integrated camera to receive and interpret control gestures indicating user commands.

As an example, a music player application has a set of basic functions (e.g. play, fast forward, rewind) and a set of advanced functions (e.g. playlist management, song rating). Users generally expect quick (or immediate) access to the basic functions of the music player application, but are willing to tolerate more complexity in carrying out the more advanced functions. However, mobile devices often have too few buttons to easily control even the basic functions. The motion recognition user interface system allows the device to map a set of control gestures to the application's basic commands. For example, an open hand could command the music player application to start playing a song, while a closed hand might command the application to stop (or pause) the song. Similarly, the interface might be configured to fast forward or rewind in response to the user moving a hand to the right or left (respectively). Similar motions up and down could be used to raise and lower the volume.

The motion recognition user interface system would work similarly for a photo album application. The basic functions for a photo album application include playing/pausing a slideshow, manually advancing to the next photo, returning to the previous photo, changing zoom level, and panning on a specific photo. These can be mapped to hand motions in a similar manner to the music player application. Of course, the system is not limited to these applications; the motion recognition user interface system could be used for many applications on a mobile device.

Figure 4:
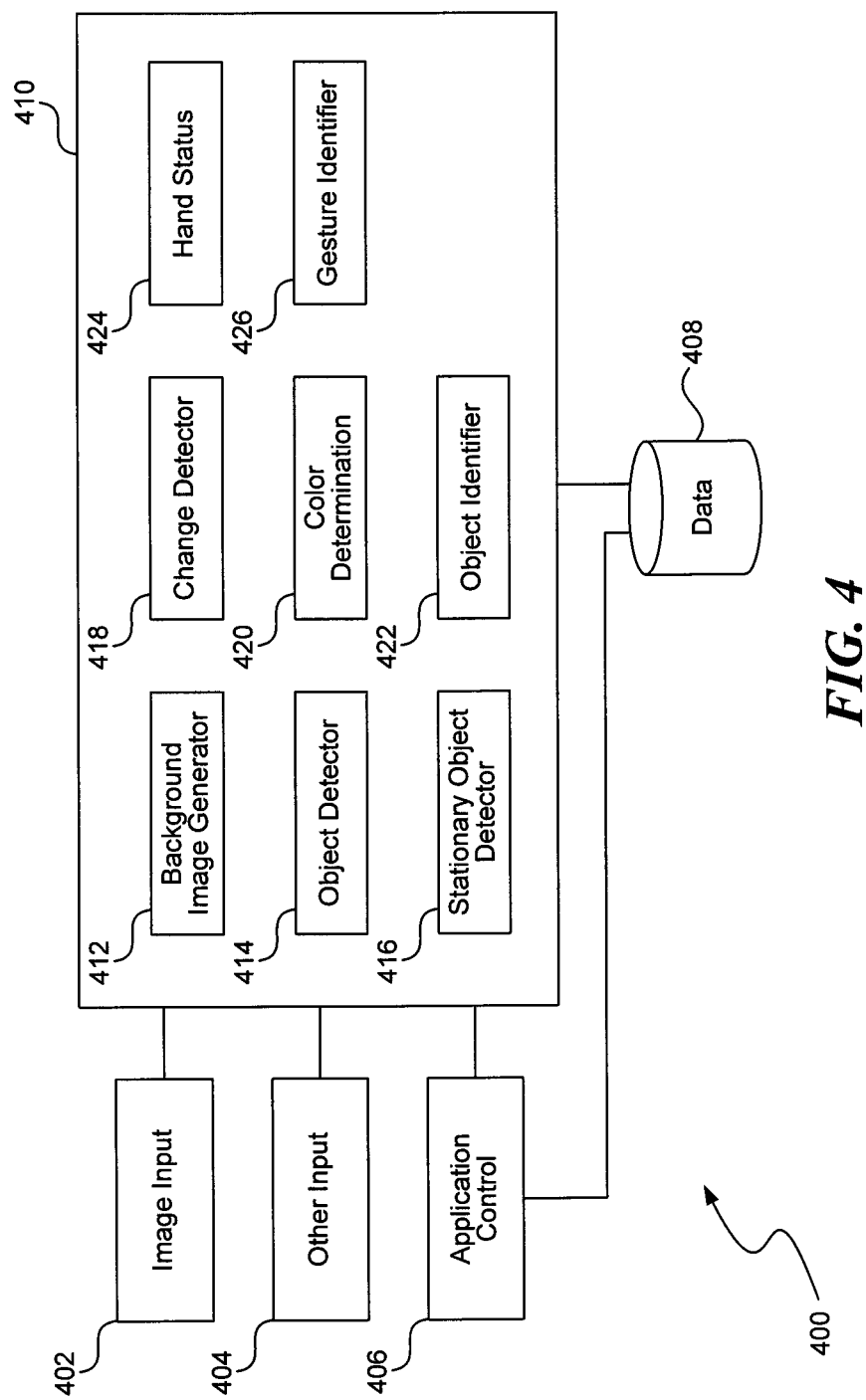
FIG. 4 illustrates a block diagram of the motion recognition user interface system.

FIG. 4 illustrates a block diagram of a motion recognition user interface system 400. Although the various modules are depicted in a single device, the modules are not necessarily physically collocated. In some embodiments, the various modules may be distributed over multiple physical devices. Similarly, the data storage could be implemented using local storage components, such as a hard drive or flash memory, or using remote storage, such as a web server accessible through the internet. The code to support the functionality of this system may be stored on a computer readable medium such as an optical drive, flash memory, or a hard drive. Aspects of the system 400 may be implemented as software, firmware, hardware, or as a combination of these.

The system includes an image input module 402, which is configured to receive image data from the camera module 108 on the mobile device or from some other optical input device. Image data is provided as a sequence of images received at a set interval, such as every tenth of a second. The system also includes an other input module 404, which is configured to receive input from other input components of the mobile device 100, such as from the touch-sensing component 109 or from an attached keyboard. The system also includes a data module 408, which stores settings and other information about the system. The data module 408 may, for example, store definitions for a configurable set of gestures that are recognized by the system and are linked to specific applications.

The system 400 also includes an activity detector module 410, which processes the sequence of images from the image input module 402 and commands from the other input module 404 to detect control gestures from the activity being viewed by the camera 108. The activity detector module 410 is connected to the application control module 406, which uses activity detection information to control the active application. The application control module 406 uses settings from the data module 408 to translate the detected activity into a command for the application to execute.

As will be described below, the activity detector module 410 includes a number of modules to execute the motion detection functions of the system. These modules may be implemented as software code executed by a general-purpose processor or in hardware on a specialized processing component. The software code to support the functionality of this system may be stored on a computer-readable medium such as an optical drive, flash memory, or a hard drive. The activity detector module 410 may have other standard modules that are not shown.

The activity detector module 410 includes the background image generator module 412, which is configured to generate a background image for use in activity detection. The background image is an image stored by the activity detector module 410 that represents the field of view of the camera 108 before the user places an object in front of it.

The activity detector module 410 also includes the object detector module 414, which processes incoming images to determine if a new object has entered the field of view of the camera 108. The object detector module 414 notifies other components of the activity detector module 410 to handle the new object. The activity detector module 410 also has a stationary object detector module 416, which processes incoming images to determine if the detected object is stationary. The activity detector module 410 also includes a change detector module 418, which determines if the detected object changes after the stationary object detector module has determined it to be stationary.

The activity detector module 410 has a color determination module 420, which evaluates the color components of the image being processed. For example, the module may determine the variation of color levels in an image or part of an image. The activity detector module 410 also includes an object identifier module 422, which classifies the type of object that has been detected by the object detector module 414. Similarly, there is also a hand state module 424, which determines the state (e.g. open or closed) of a hand that is detected by the object identifier module 422. Finally, the activity detector module 410 includes a gesture identifier module 426, which determines the type of gesture being made (e.g. by determining the direction of movement).

Figure 5:
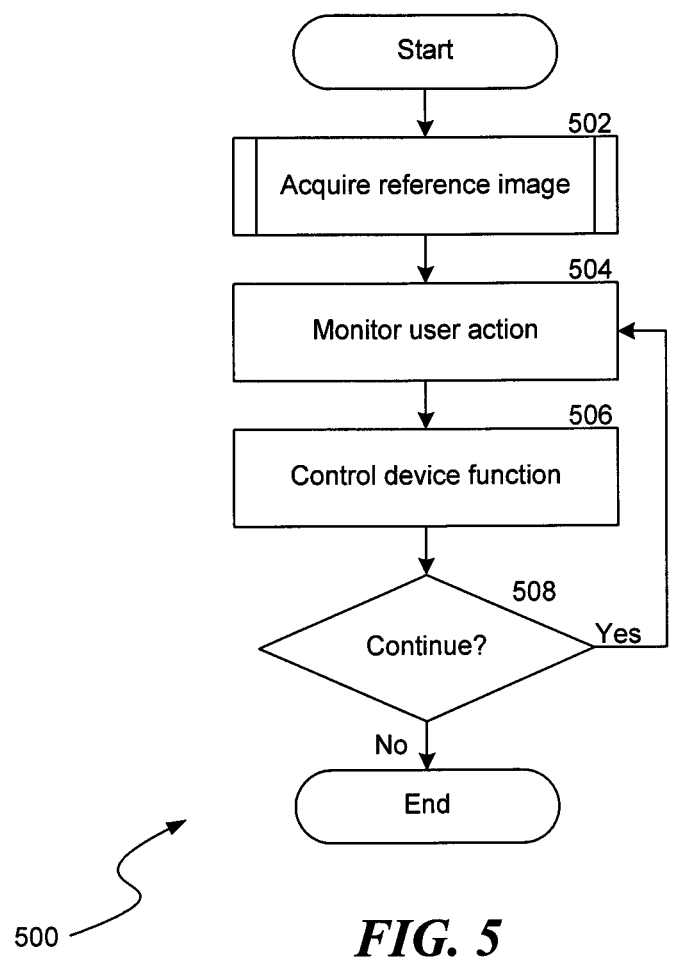
FIG. 5 illustrates a flowchart of a process for implementing the motion recognition user interface system.

FIG. 5 illustrates a flowchart of a process 500 for implementing the motion recognition user interface system. The system begins processing in step 502, where it acquires a background image. The process for acquiring a background image is discussed below with reference to FIG. 6. After acquiring the background image, the system proceeds to step 504, where it monitors the user's action. In this step, described in detail below, the system looks for a new object in camera view, detects control gestures and determines what actions are associated with the control gestures. The system then proceeds to step 506, where it controls the device function based on the action determined in step 504. Finally, the system proceeds to step 508, where it determines whether to continue processing inputs for the motion control system. If yes, the system returns to step 504 to monitor for the next user action. Otherwise, the system exits.

Figure 6:
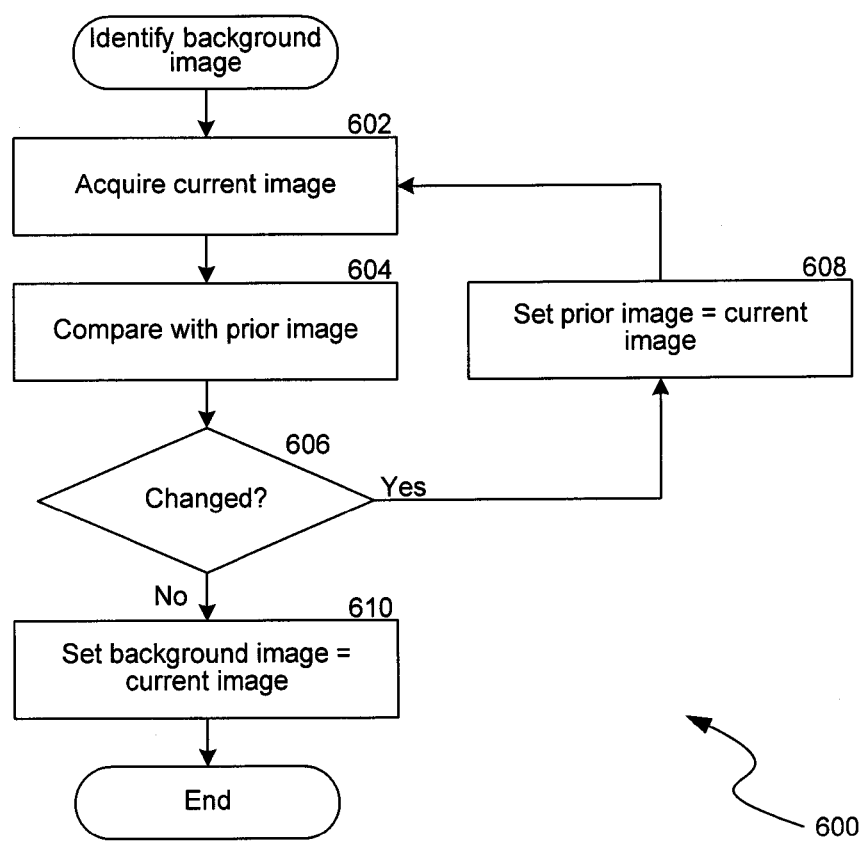
FIG. 6 illustrates a flowchart of a process implemented by the background image generator for generating a background image for the system.

FIG. 6 illustrates a flowchart of a process 600 implemented by the background image generator 414 for generating a background image for the system. The background image shows the field of view of the camera before motion recognition begins (i.e. when nothing is happening). Thus, the process 600 generates the background image by storing an image of the view when it is static for a period of time. The system begins processing at step 602, where it acquires the current image from the image input module 402. After receiving the current image, the system then proceeds to step 604, where it compares the current image to the prior image. After comparing the images, the system proceeds to decision block 606, where it uses the comparison to determine if the image changed. If the image changed, the system proceeds to step 608, where it stores the current image as the previous image and repeats the process. If the image did not change, the system proceeds to step 610, where it stores the current image as the background image.

In one implementation, the system compares the images in step 604 by generating a difference image (i.e. by subtracting corresponding pixel values in the two images). In decision block 606, the system can then calculate a metric from the difference image to indicate the degree of change shown. For example, the system may detect a change by comparing the sum of the pixel values in the difference image to a specified threshold. The threshold may be set according to theoretical expectations about differences or might be determined empirically from analysis of multiple situations. The value may be chosen so that the system ignores minor fluctuations in the camera view while detecting larger changes.

Figure 7:
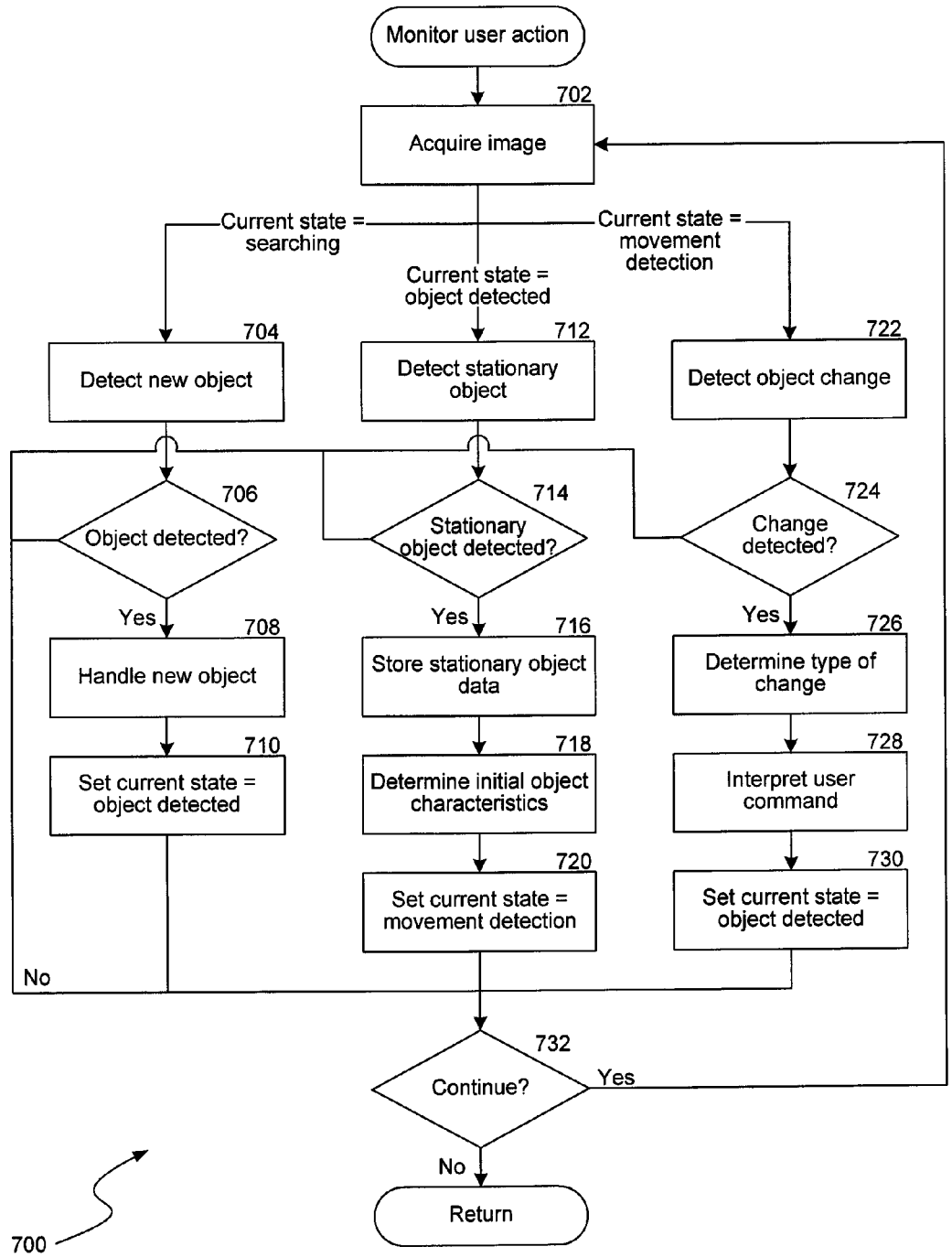
FIG. 7 illustrates a flowchart of a process for monitoring user actions.

FIG. 7 illustrates a flowchart of a process 700 for implementing the monitor step 504. The process 700 is implemented as a loop that processes each image received from the camera 108. The process 700 acts as a state machine with three possible states: Searching, Object Detected, and Movement Detection. After the background image is acquired, the system enters the Searching state, where it looks for an object in the camera's field of view. After detecting an object, the system proceeds to the Object Detected state, where it detects if the object is stationary. This state helps the system avoid detecting control gestures based on transient objects. If the system detects that there is a stationary object in the field of view, it enters the Movement Detection state, where it determines if the object has changed position or state (indicating a command).

To reduce complexity, some aspects of the system's processing have been omitted from the flowchart in FIG. 7. For example, a large change is more likely to indicate that an object was removed or the camera was covered up, rather than indicating a command. Thus, the system may transition from Movement Detection or Object Detected to Searching if there is a particularly large change in the image. Similarly, the system may return to Searching if it detects an object significantly different from what it had previously detected (e.g., if it detects a head in the current image after detecting a hand in the previous image).

The system begins processing in step 702, where it receives the current image from the image input component 402. After acquiring a new image, the system branches depending on its current state. If the current state is Searching, the system proceeds to step 704, where it attempts to detect a new object. In general, this is done by comparing the contents of the current image to the previous image or to the background image. The system then detects an object if the images differ by more than a specified threshold. This can be done, for example, using the difference image method described above. The system then proceeds to decision block 706, where it branches depending on the results of the detection step. If the system did not detect a new object, it proceeds to decision block 732, where it determines if it will continue processing motion inputs. If not, processing ends. If yes, processing returns to step 702, where the system acquires a new image for processing.

If the system detected a new object, it proceeds to step 708, where it handles the new object. In this step, the system generates an image of the object by comparing the current image to the background image. The system then stores an image containing only the pixels of the current image that differ from the background image. After storing the object data, the system proceeds to step 710, where it changes the current state to Object Detected. The system then proceeds to step 732 and either exits or returns to the beginning of the loop to acquire the next image in step 702.

If the current state is Object Detected, the system proceeds from step 702 to step 712, where it attempts to detect a stationary object. The system may do this by determining if the image as a whole is stationary. The system detects a stationary image by comparing the current image to the previous image. If there was no change, the object is determined to be stationary. The system can detect changes using methods similar to those used to generate the background image. For example, the system many use the difference image method described above with reference to FIG. 6.

After evaluating if the object is stationary, the system proceeds to block 714, where it branches based on the result. If the system determines that the object is not yet stationary, it continues to step 732 and either exits or returns to the beginning of the loop. Otherwise, the system proceeds to step 716, where it stores the data about the stationary object. The system may, for example, update the stored object in the data module 408 by comparing the current image and the background and storing pixels that differ, as discussed above with reference to step 708. After storing the updated object data, the system proceeds to step 718, where it determines initial characteristics of the object, such as position, dimensions, object type and hand state. The system uses these initial characteristics in the next state to detect a command gesture. Methods of determining object type are discussed below with reference to FIGS. 8A and 8B. A method for determining hand state is discussed below with reference to FIGS. 9A and 9B. After the system has determined the starting object information, it proceeds to step 720, where it sets the current state to Movement Detection. The system then exits or repeats the loop with a new image by proceeding to step 732 and step 702.

If the current state is Movement Detection, the system proceeds to step 722, where it attempts to detect a change in the object currently being tracked. In one embodiment, the system uses a process similar to the process of step 704 to detect an object change. In this embodiment, the system compares the current image to the previous image. The system then proceeds to decision block 724, where it branches based on whether the comparison indicates that the object has moved. Alternatively, in step 722 the system may use the object characteristics determined in step 718 to detect changes indicating a command. The system uses the object characteristics determined in steps 716 and 718 to detect changes indicating a command. For example, if the object was initially detected as a hand, the system may check each new image to determine whether the hand state has changed (i.e. from open to closed or closed to open). Similarly, the system may use position and dimensions to determine if the hand has moved laterally or has moved nearer to or farther from the mobile device. The process for doing this is discussed below with reference to FIGS. 10A-10C.

After detecting changes, the system proceeds to decision block 724, where it branches depending on the results from step 722. As above, if there was no change, the system returns to the beginning of the loop and starts acquires the next available image for processing. If there was a change, the system proceeds to step 726, where it determines the type of change that was detected. The system determines type of change by comparing current object characteristics to initial object characteristics determined in step 718. Thus, if the current object characteristics were not calculated during step 722, the system calculates the current values in step 726 before comparing the current values to the initial values.

After determining the type of change, the system proceeds to step 728, where it interprets the user command based on the types of change detected. As discussed above, the user command varies depending on the application and may be user configurable. In general, the system determines the user command by matching the detected change to a list of commands stored in the data module 408. The system then provides the command to the application.

After interpreting the user command, the system proceeds to step 730, where it changes the current state to Object Detected. After interpreting a user command, the system waits until the object is stationary again before interpreting a new command. This helps to avoid executing the same command twice based on a single user motion. The system may also include other measures to avoid duplicating commands. For example, the system may be configured with a waiting period between gestures, so that it is idle for a set period of time (e.g. 0.5 second) before returning to the Object Detected state. The system might also combine these methods. Alternatively, the system might be configured to ignore a second command if it repeats a first command and comes within a set period after the first command.

III. Object Characteristics and Change Detection

As discussed above, the system uses a set of object characteristics, including object type, hand state, position, and width, to determine the requested user command. Methods for calculating these characteristics are described below.

Figure 8A:
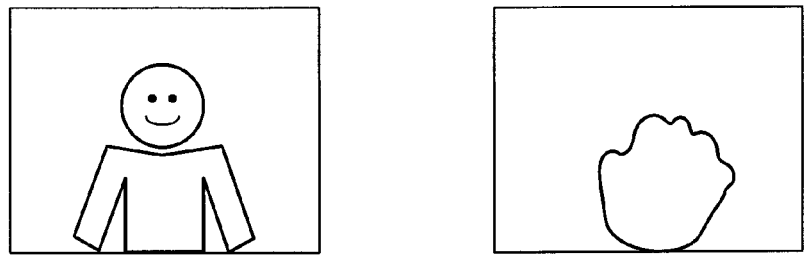
FIG. 8A illustrates example types of objects that might be identified and FIG. 8B illustrates a flowchart of a process for classifying object type.
Figure 8B:
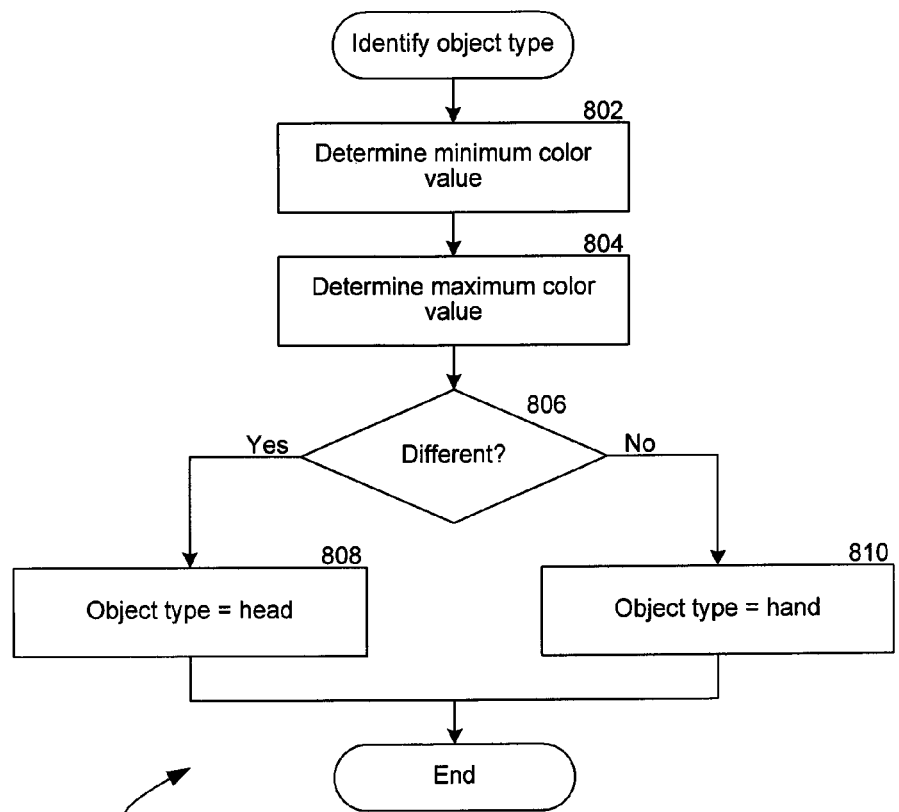

FIGS. 8A and 8B illustrate a method for classifying detected objects by type. FIG. 8A illustrates example images of a head and a hand, both of which are likely to be seen by the camera 108. FIG. 8B illustrates a flowchart of a process 800 for distinguishing these types. The process 800 uses color characteristics of the two objects to distinguish type. The system begins processing at step 802, where it determines the maximum color value found in the object. It then proceeds to step 804, where it determines the minimum color value found in the object. At decision block 806, the system determines whether the maximum color value and the minimum color value are different. As shown in FIG. 8A, an image of a head generally has a wide variation in color. Thus, if the maximum and minimum color values are different, the system proceeds to step 808, where it classifies the object as a head. Similarly, an image of a hand generally has little variation in color. So, if the colors are not identical (or differ by only a small amount), the system proceeds instead to step 810 where it classifies the object as a hand.

Figure 9A:
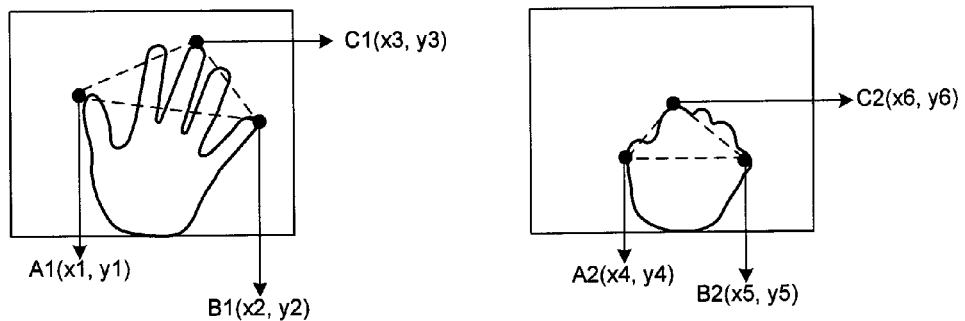
FIG. 9A illustrates images of an open hand and a closed hand.
Figure 9B:
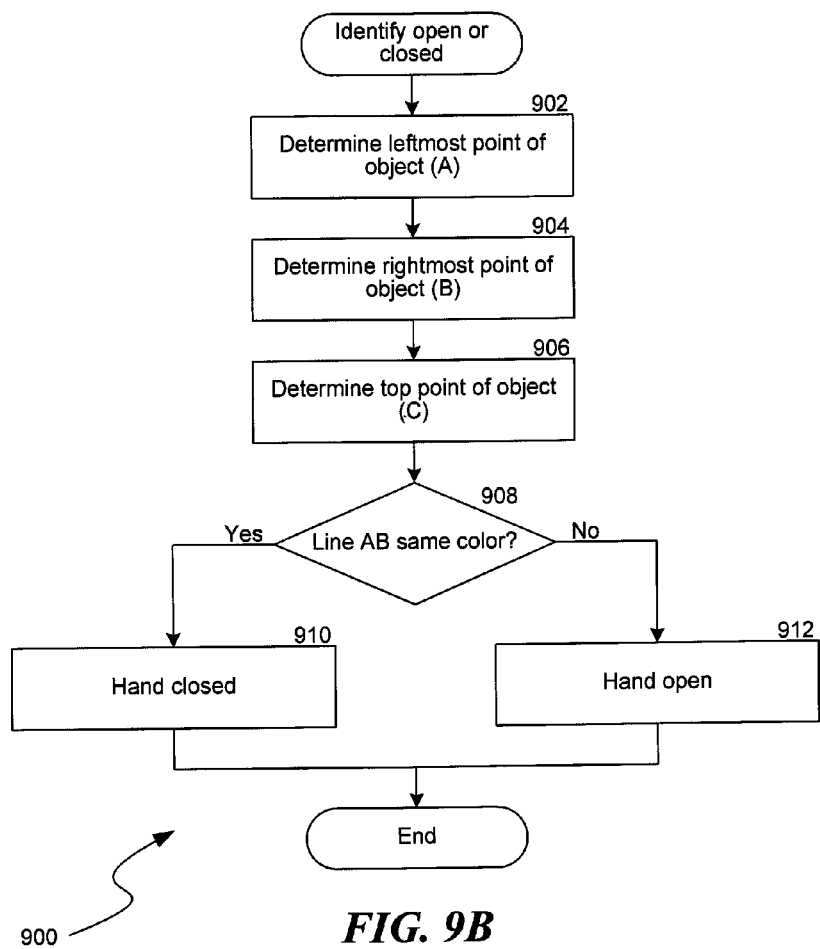
FIG. 9B shows a flowchart of a process for determining whether the object in view is open or closed.

If the object is a hand, the system may also determine the state of the hand (i.e. open or closed). FIG. 9A shows images of an open hand and a closed hand. FIG. 9B shows a flowchart of a process 900 for determining whether the object in view is open or closed. In step 902, the system determines the leftmost point of the object (denoted point A). In step 904, the system determines the rightmost point of the object (denoted point B). In step 906, the system determines the topmost point of the object (denoted point C). In decision block 908, the system determines whether the segment from A to B is a single color. As shown on the right side of FIG. 9A, if the object is a closed hand the segment AB crosses only the hand itself. Thus, if the color is uniform across the segment, the system proceeds to step 910, where it sets the hand state to closed. In contrast, as shown on the left side of FIG. 9A, if the object is an open hand, the segment includes pixels outside the object. In this case, the color is not uniform, so the system proceeds to step 912, where sets the hand state to open.

The system may determine a position for a detected object by averaging the positions of a set of pixels in the object. For example, the system may use points A, B, and C from the hand state process 900 as the basis for determining position. Thus, the position of the open hand on the left of FIG. 9A would be $$P = \left( \frac{x1 + x2 + x3}{3}, \frac{y1 + y2 + y3}{3} \right).$$

The system might use points A, B, and C for efficiency, because they are already determined, but it is not so limited. Other points on the object could also be used, or even the full object.

The system may also determine a representative dimension of the object using a similar method. For example, the system may use the leftmost point (A) and the rightmost point (B) to define the width. As shown in FIG. 9A, a line segment between the two points describes the width of the object. Thus, the system calculates the width as the distance between the two points A and B. Of course, although position and width are shown being calculated for a hand, the same method can be used for any other object, such as a head. Other representative dimensions may be calculated using a similar method.

Figure 10A:
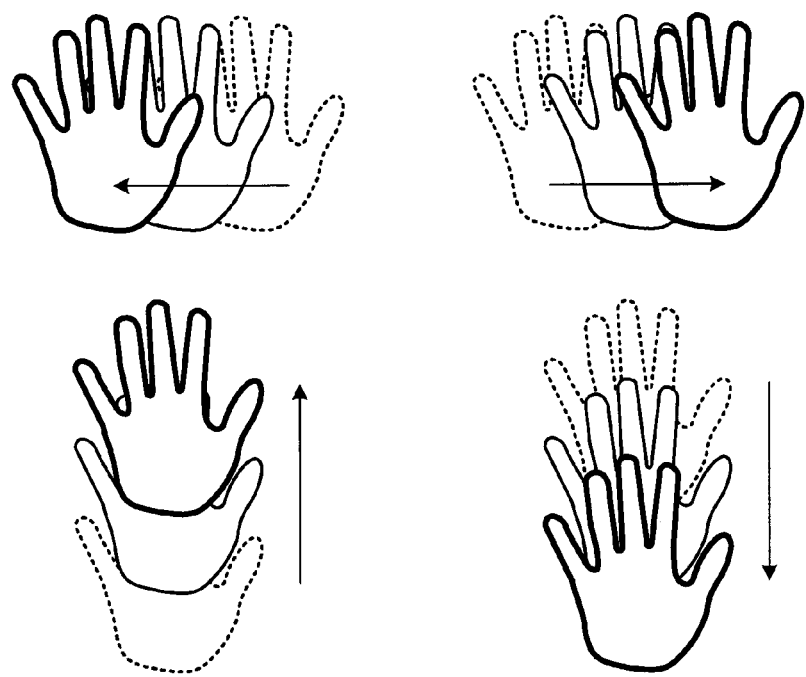
FIGS. 10A and 10B illustrate example types of motions that the motion recognition user interface system can detect.
Figure 10B:
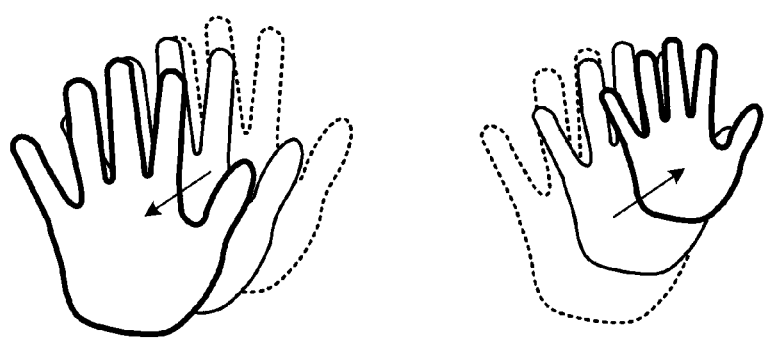

As discussed above, the system uses the object's characteristics to detect changes, including changes in hand state, lateral motion, and changes in distance. To detect a change in hand state, the system compares the object's initial hand state to its current hand state. A change is found if the states differ. Further, FIGS. 10A and 10B illustrate other types of motion that the system can detect. FIG. 10A shows various types of lateral motion that the system can detect, including motion to the left, right, up, or down. Similarly, FIG. 10B shows changes in object distance that the system can detect, such as the object moving closer or farther away.

Figure 10C:
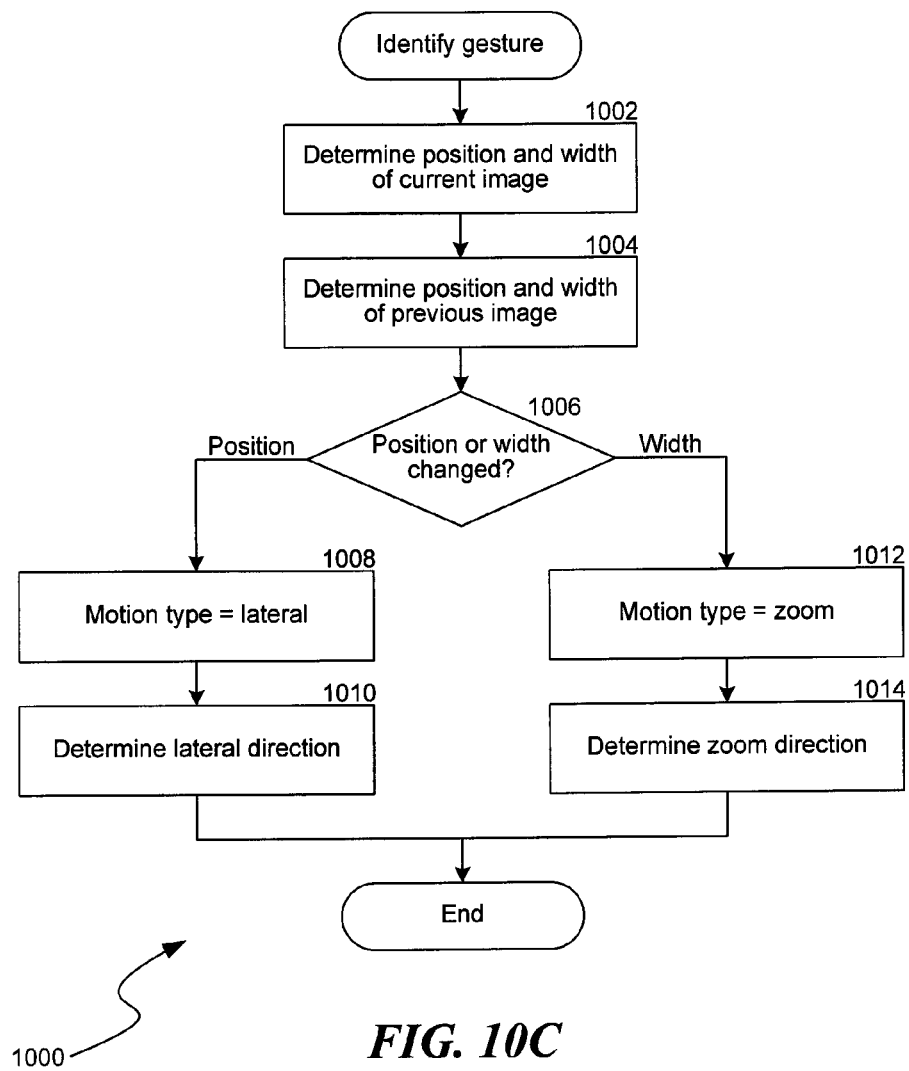
FIG. 10C illustrates a flowchart of a process for identifying a hand motion.

FIG. 10C illustrates a flowchart of a process 1000 for detecting these types of motion. The system begins processing at step 1002, where it determines the position and width of the object in the current image. It then proceeds to step 1004, where it determines the position and width of the object in the previous image. After determining current and previous position and width, the system proceeds to decision block 1006, where it determines whether the position or width of the object has changed between images. If the position has changed, the system proceeds to step 1008, where it interprets the motion as a lateral motion of the type shown in FIG. 10A. The system then proceeds to step 1010, where it determines the lateral direction of the motion based on the change in position between images. If the width has changed, the system proceeds to step 1012, where it interprets the motion as a change in distance from camera to object, as shown in FIG. 10B. The system then proceeds to step 1014, where determines the zoom direction based on the change in width between images. As shown in FIG. 10B, the width of an object increases as the object comes closer to the camera and decreases as the object recedes.

IV. Conclusion

Although many of the comparisons discussed above are described as requiring exact equality, the system is not so limited. Because of the limitations of real-world systems, some variation in values is expected. Thus, for comparisons above that test whether images or colors are equal, exact equality is generally not required. Instead, the system may use a variation threshold to account for real-world variation. In this configuration, two quantities are considered equal if the difference between the values is less than the threshold. The threshold values may be hard-coded into the system at design time or they may be configurable. The values may be chosen according to theoretical predictions or based on experimental determination.

The system may also use multiple images for the detection steps described above. For example, the system may use a rolling average of pixel values from several (e.g. 3) images to generate the background image or the current image used to detect objects.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for interpreting a control gesture to a mobile device having an image sensor capable of providing a sequence of images, comprising:
   comparing a second image of the sequence of images to a first image of the sequence of images, the comparing including a comparison between content of the second image and the first image;
   if the second image is substantially identical to the first image and has the same content, setting the second image as a background image;
   detecting an object if a third image of the sequence of images differs substantially from the background image;
   storing only the pixels of said object in the third image that differ substantially from the background image;
   using the stored pixels of the object, determining if the detected object is stationary based at least in part on an absence of change of the object among multiple images of the sequence of images;
   if the detected object has been determined to be stationary, storing only the pixels of the detected stationary object and determining initial object characteristics from the stored pixels;
   detecting a change in the detected object among multiple images of the sequence of images;
   using the initial object characteristics, determining one or more parameters associated with the detected change;
   interpreting a user command indicated by the determined one or more parameters,
      wherein the interpreted user command is ignored if the interpreted user command is received within a specified time after a previous user command; and
   executing an action associated with the interpreted user command.

2. The method as claimed in claim 1, wherein detecting an object further comprises:
   if a part of the third image differs substantially from a corresponding part of the background image, designating the part of the current image as the detected object.

3. The method as claimed in claim 1, wherein detecting a change comprises:
   determining a value of a parameter associated with the object; and
   detecting if the value of the parameter changes in a later image of the sequence of images.

4. The method as claimed in claim 1, further comprising:
   classifying the detected object by object type; and
   determining parameters of the one or more parameters selected depending on the object type of the detected object.

5. The method as claimed in claim 1, further comprising:
   determining a first location of the object in a first image of the sequence of images; and
   determining a second location of the object in a second image of the sequence of images;
   wherein determining one or more parameters comprises determining a direction parameter by determining the direction of change from the first location to the second location.

6. The method as claimed in claim 1, wherein determining one or more parameters associated with the detected change comprises:
   determining a first hand state associated with the detected object if the detected object is stationary;
   determining a second hand state associated with the detected object after the detected change; and
   if the first hand state differs from the second hand state, generating a parameter indicating a change between the first hand state and the second hand state,
   wherein determining a first hand state and determining a hand state comprise:
      determining a first point of the detected object;
      determining a second point of the detected object;
      if a segment between the first point and the second point is substantially a single color, setting the hand state to closed; and
      if the segment between the first point and the second point is not substantially a single color, setting the hand state to open.

7. The method as claimed in claim 1, wherein determining one or more parameters associated with the detected change comprises:
   if the detected object is stationary, determining a first hand state associated with the detected object;
   after the change is detected, determining a second hand state associated with the detected object; and
   generating a parameter indicating a change between the first hand state and the second hand state.

8. The method as claimed in claim 1, wherein determining if the detected object is stationary further comprises:
   comparing a current image of the sequence of images to a previous image of the sequence of images; and
   designating the object as stationary if the current image is substantially identical to the previous image.

9. An apparatus for interpreting a control gesture to a mobile device, comprising:
   a camera configured to generate a sequence of images;
   a memory; and
   a processor coupled to the camera and the memory, wherein the processor is configured to execute various components, wherein the components comprise:
      a background image generator component configured to compare a second image of the sequence of images to a first image of the sequence of images and set the second image as the background image if the second image is substantially identical to the first image, the comparing including a comparison between content of the second image and the first image;
      an object detector component configured to detect an object in the sequence of images if a third image of the sequence of images differs substantially from the background image, the object detector storing only the pixels of said object in the third image that differ substantially from the background image;
      a stationary object detector component configured to use the stored pixels of the object to determine if the object is stationary based at least in part on an absence of change among multiple images of the sequence of images, and to store only the pixels of the stationary object;
a change detector component configured detect a change in the object among multiple images of the sequence of images after the object is determined to be stationary;
a gesture identifier component configured to determine one or more parameters associated with the detected change;
an application control component configured to interpret a user command indicated by the one or more parameters,
wherein the application control component is further configured to ignore the interpreted user command if the interpreted user command is received within a specified time after a previous user command; and
a mobile application configured to receive the user command from the application control component and to execute an action associated with the user command.

10. The apparatus as claimed in claim 9, further wherein the processor is further configured to execute:
wherein the object detector component is configured to detect the object by comparing the third image to the background image and, if a part of the third image differs substantially from a corresponding part of the background image, designating the part of the third image as the detected object.

11. The apparatus as claimed in claim 9, wherein the change detector is configured to detect a change by determining a value of a parameter associated with the object and detecting if the value of the parameter changes in a later image of the sequence of images.

12. The apparatus as claimed in claim 9, wherein the gesture identifier component is further configured to:
determine a first dimension of the object in a first image of the sequence of images; and
determine a second dimension of the object in a second image of the sequence of images;
wherein determining one or more parameters comprises determining a distance change parameter by determining a change in magnitude between the first dimension and the second dimension.

13. The apparatus as claimed in claim 9, wherein the processor is further configured to execute:
a hand state detector component configured to determine a first hand state associated with the detected object if the detected object is stationary and a second hand state associated with the detected object after the detected change,
wherein the gesture identifier is further configured to generate a parameter indicating a change between the first hand state and the second hand state.

* * * * *